US011374643B2

(12) United States Patent
Kim et al.

(10) Patent No.: US 11,374,643 B2
(45) Date of Patent: Jun. 28, 2022

(54) BEAM OPERATION METHOD AND DEVICE AT TERMINAL OF BEAMFORMING COMMUNICATION SYSTEM

(71) Applicant: Samsung Electronics Co., Ltd., Suwon-si (KR)

(72) Inventors: Daehoon Kim, Suwon-si (KR); Bongjin Kim, Suwon-si (KR); Taekyoung Kim, Suwon-si (KR); Jongho Oh, Suwon-si (KR); Hyoungjin Lim, Suwon-si (KR); Jungju Kim, Suwon-si (KR); Eungkuk Nam, Suwon-si (KR); Joosung Park, Suwon-si (KR); Wonjun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 16/954,044

(22) PCT Filed: Jan. 31, 2019

(86) PCT No.: PCT/KR2019/001378
§ 371 (c)(1),
(2) Date: Jun. 15, 2020

(87) PCT Pub. No.: WO2019/156431
PCT Pub. Date: Aug. 15, 2019

(65) Prior Publication Data
US 2021/0083753 A1 Mar. 18, 2021

(30) Foreign Application Priority Data

Feb. 8, 2018 (KR) .................. 10-2018-0015925

(51) Int. Cl.
*H04B 7/08* (2006.01)

(52) U.S. Cl.
CPC ........... *H04B 7/0834* (2013.01); *H04B 7/082* (2013.01); *H04B 7/088* (2013.01)

(58) Field of Classification Search
CPC ...... H04B 7/088; H04B 7/0404; H04B 7/043; H04B 7/0897; H04B 7/0834; H04B 7/082
See application file for complete search history.

(56) References Cited

U.S. PATENT DOCUMENTS

| 8,774,086 B2 | 7/2014 | Song et al. |
| 10,236,946 B2 | 3/2019 | Park et al. |

(Continued)

FOREIGN PATENT DOCUMENTS

| EP | 3 293 890 A1 | 3/2018 |
| KR | 10-2014-0000174 A | 1/2014 |

(Continued)

OTHER PUBLICATIONS

European Office Action dated May 19, 2021, issued in European Application No. 19751479.7.

(Continued)

*Primary Examiner* — Rahel Guarino
(74) *Attorney, Agent, or Firm* — Jefferson IP Law, LLP (57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business, a security and safety-related service, etc.) on the basis of 5G communication technology and IoT-related technology. A communication method of a terminal of a mobile communication system, according to one embodiment of the present specification, comprises the steps of: acquiring moving (Continued)

speed information of a terminal; determining a reception beam candidate group on the basis of the moving speed information; and determining a reception beam, in the reception beam candidate group, for receiving a signal.

14 Claims, 8 Drawing Sheets

(56) References Cited

U.S. PATENT DOCUMENTS

| | | |
|---|---|---|
| 2013/0343303 A1 | 12/2013 | Kim et al. |
| 2014/0099983 A1 | 4/2014 | Sarca et al. |
| 2014/0225775 A1* | 8/2014 | Clevorn .................. H01Q 3/34 342/372 |
| 2016/0150418 A1 | 5/2016 | Kang et al. |
| 2016/0329636 A1 | 11/2016 | Larsson et al. |
| 2017/0223552 A1 | 8/2017 | Roy et al. |
| 2017/0251518 A1 | 8/2017 | Agiwal et al. |
| 2017/0288763 A1 | 10/2017 | Yoo et al. |
| 2017/0339575 A1 | 11/2017 | Kim et al. |
| 2019/0045494 A1* | 2/2019 | Ho ...................... H04W 72/042 |

FOREIGN PATENT DOCUMENTS

| | | |
|---|---|---|
| KR | 10-2015-0066630 A | 6/2015 |
| KR | 10-2016-0039571 A | 4/2016 |
| KR | 10-2017-0129377 A | 11/2017 |
| WO | 2012/102653 A1 | 8/2012 |
| WO | 2016/190653 A1 | 12/2016 |
| WO | 2017/007177 A1 | 1/2017 |

OTHER PUBLICATIONS

Korean Office Action dated Jun. 28, 2021, issued in Korean Application No. 10-2018-0015925.
European Search Report dated Dec. 21, 2020, issued in European Application No. 19751479.7.
A Notification of a Decision to Grant dated Jan. 11, 2022, issued in a counterpart Korean Application No. 10-2018-0015925.
Indian Office Action dated Jan. 31, 2022, issued in a counterpart an Indian Application No. 202037031042.

* cited by examiner

| ACTIVITY | ROTATION SPEED (rpm) | MOVEMENT ANGLE per 100 ms |
| --- | --- | --- |
| READ, WEB BROWSING (NO DIRECTION CHANGE) | 10 - 18 | 6° - 11° |
| READ, WEB BROWSING (VERTICAL/HORIZONTAL DIRECTION CHANGE) | 50 - 68 | 30° - 36° |
| GAME EXECUTION | 120 - 133 | 72° - 80° |

BEAM OPERATION METHOD AND DEVICE AT TERMINAL OF BEAMFORMING COMMUNICATION SYSTEM

CROSS-REFERENCE TO RELATED APPLICATION(S)

This application is a U.S. National Stage application under 35 U.S.C. § 371 of an International application number PCT/KR2019/001378, filed on Jan. 31, 2019, which is based on and claims priority of priority of a Korean patent application number 10-2018-0015925, filed on Feb. 8, 2018, in the Korean Intellectual Property Office, the disclosure of which is incorporated by reference herein in its entirety.

TECHNICAL FIELD

An embodiment of the disclosure relates to a beam operation method of a terminal in a wireless communication system using beamforming, and an apparatus using the same. More particularly, the disclosure relates to a method for a terminal to be able to adaptively perform a reception beam selection in accordance with a state of the terminal in a beamforming communication system, and an apparatus using the same.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

In order to improve the transmission/reception performance in the communication system as described above, the beamforming may be performed using a plurality of antennas. The above-described beamforming may also be performed even in a massive MIMO system using a plurality of antennas. In order to perform the beamforming as described above, a beam that is used for at least one of transmission and reception should be selected, and as the number of usable beams is increased, complexity of measurement and determination stages for selecting an optimum beam for the beam selection may also be increased. Accordingly, a method and a device capable of effectively performing the beam selection are required.

DISCLOSURE OF INVENTION

Technical Problem

An embodiment of the disclosure is proposed to solve the above-described problems, and an aspect of the disclosure is to provide a method and a device for effectively performing communication in a wireless communication system using beamforming. More specifically, the disclosure can provide a method and a device for effectively selecting a reception beam based on terminal-related information, and the method and the device as described above can effectively perform the beam selection by performing the beam selection based on the terminal-related information.

Solution to Problem

In order to achieve the above-described subject, a communication method of a terminal in a mobile communication system according to an embodiment of the disclosure includes acquiring movement speed information of the terminal; determining a reception beam candidate group based on the movement speed information; and determining a reception beam for a signal reception from the reception beam candidate group.

A terminal in a mobile communication system according to another embodiment of the disclosure includes a transceiver; and a controller connected to the transceiver and configured to: acquire movement speed information of the terminal, determine a reception beam candidate group based on the movement speed information, and determine a reception beam for a signal reception from the reception beam candidate group.

Advantageous Effects of Invention

According to the embodiments of the disclosure, the signal transmission/reception performance can be improved in the beamforming wireless communication system. More specifically, because the terminal determines the beam candidate group for the reception beam selection based on the terminal information, more effective candidate group selection is possible, and the communication performance improvement can be sought by reducing the measurement and determination time for the beam selection through optimization of the number of candidate groups.

MODE FOR THE INVENTION

Hereinafter, embodiments of the disclosure will be described in detail with reference to the accompanying drawing.

In explaining embodiments, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

Further, examples of a method and a device as described in embodiments are not contrary to each other, and it is apparent that features disclosed in some embodiments can also be applied to other embodiments.

Figure 1:
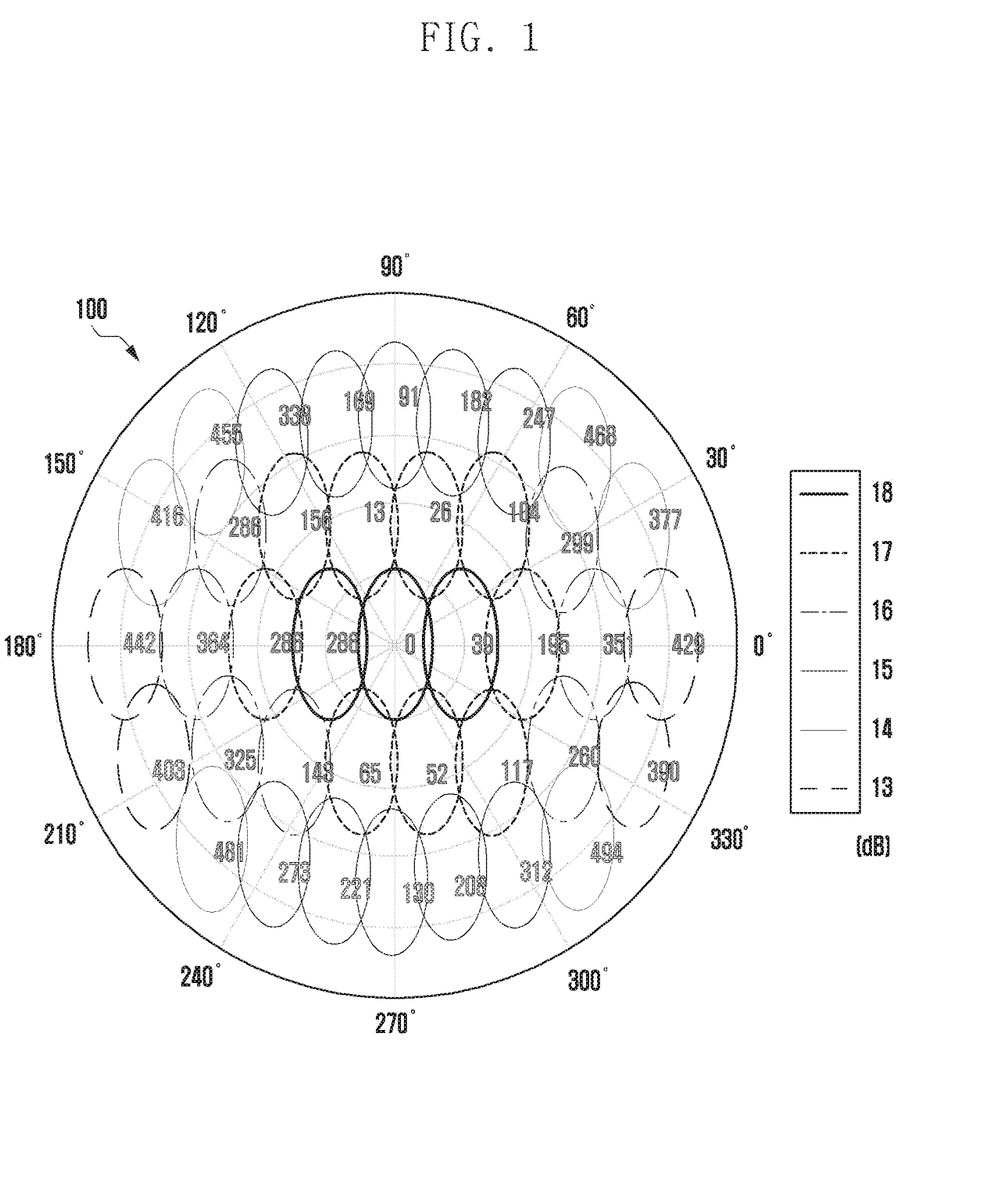
FIG. 1 is a diagram explaining a reception gain according to beamforming of a communication system.

FIG. 1 is a diagram explaining a reception gain according to beamforming of a communication system.

With reference to FIG. 1, in a beamforming system, a transmitter may transmit a signal by determining a transmission beam for beamforming, and a receiver may receive a signal by determining a reception beam. According to an embodiment of the disclosure, in accordance with a reception beam selection of a terminal, a gain according to the beamforming may differ.

In case of a high-frequency system, a beamforming system is essential due to a severe path loss. In the beamforming system, a channel differs according to a selected beam, and thus the performance of the terminal differs. For an optimum performance of the terminal, it is preferable to select an optimum reception beam among determined beams. For this, the terminal determines the terminal reception beam by measuring and comparing reception sensitivities of the determined beams.

In an identification number 100, beam indexes corresponding to respective angles based on a location of the terminal are denoted by numerals, and angles for reference are indicated. In an embodiment, reception gains in accordance with selection of the respective beam indexes are indicated. The indicated beam indexes are based on a front side (bore sight), and more specifically, in an embodiment, if index 0 is selected, the reception gain is most increased, whereas if a beam of an index indicated outside in the drawing is selected, the reception gain in accordance with the beamforming is decreased.

As described above, the terminal can perform an operation of selecting a beam for optimizing the reception gain. More specifically, it is possible to select the beam having the maximum gain in a reception beam candidate group of a specific number by selecting the corresponding candidate group and determining the reception gain when the beam of the candidate group is used. In this case, if the number of candidate groups is increased, it is advantageous that the gain can be measured with respect to more reception beams, but it may be difficult to effectively cope with the state change of the terminal. In particular, in case of a terminal which moves at high speed or of which the location angle is frequently changed, if time required to select the optimum beam as described above is lengthened, there is a possibility that a difference in gain between the optimum reception beam measured from the candidate group and the reception beam actually having the maximum gain occurs.

More specifically, in an embodiment, if total 39 reception beam candidate groups are measured, and a reference signal for the measurement is transmitted every 10 ms, time consumption for measuring the total reception beam candidate groups may be 390 ms. In this case, if the terminal moves or is rotated, the selected reception beam is unable to show the optimum performance. However, in case of reducing the reception beam candidate groups in this case, the reception gain gap between the beams of the candidate groups is increased, and the reception performance may deteriorate even if the beam in the candidate group is promptly selected. Accordingly, there is a need for a reception beam candidate group selection method for determining the optimum reception beam even while reducing the beam determination time through variation of the number of reception beam candidate groups in accordance with the state of the terminal, and it is necessary to variably determine the number of reception beam candidate groups based on the speed of the terminal, and based on this, to reduce the determination time required to determine the optimum reception beam.

Figure 2:
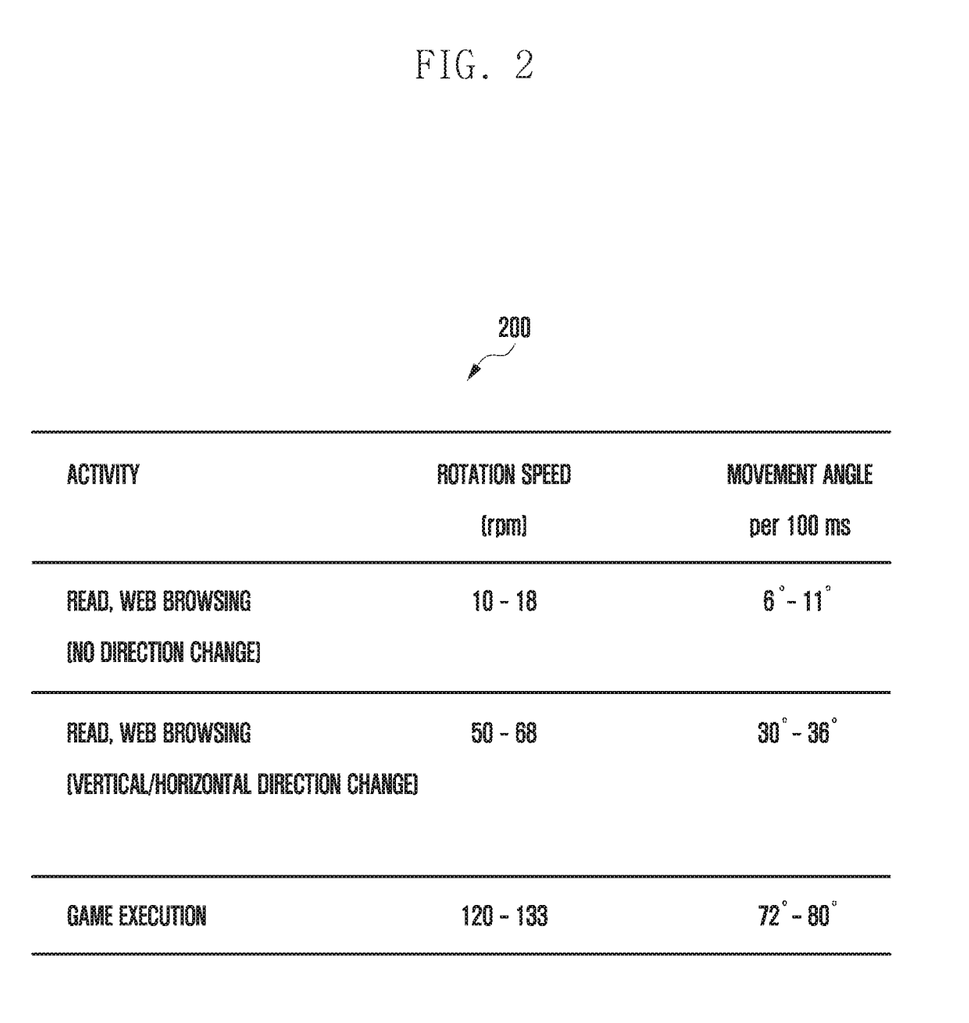
FIG. 2 is a diagram explaining the degree of rotation change in accordance with an active state of a terminal.

FIG. 2 is a diagram explaining the degree of rotation change in accordance with an active state of a terminal.

With reference to FIG. 2, in an identification number 200, a rotation speed in accordance with an activity of the terminal and a rotation angle per 100 ms are indicated. In an embodiment, the terminal may be an electronic device which can perform communication and in which an application can be installed, and may be a smart phone as an example. Such information may be measured based on an operation of the terminal in a communication system using a millimeter signal and a behavior of a human.

More specifically, in case that a terminal user generally reads a screen or executes web browsing, the rotation speed is 10 to 18 rpm, and in this case, there is an angle change of 6 to 10 degrees per 100 ms.

Further, in case that a terminal user generally reads a screen or executes a web browsing, and a vertical/horizontal direction of the terminal is changed, the rotation speed is 50 to 68 rpm, and in this case, there is an angle change of 30 to 36 degrees per 100 ms. This may occur in case of changing a screen display mode of the terminal in accordance with directions.

Further, in case that a terminal user plays the game, the rotation speed may be 120 to 133 rpm, and in this case, an angle change of 72 to 80 degrees per 10 ms may occur.

As described above, the terminal may be rotated in accordance with the terminal usage state of the user, and if the terminal is rotated, the channel is changed, and thus the optimum reception beam may be changed. However, in case that the reception beam change is unable to be performed for the above-described time, the signal reception performance may deteriorate. As described above, the number of reception beam selection candidate groups can be adjusted in consideration of the degree of change of the optimum reception beam.

Figure 3:
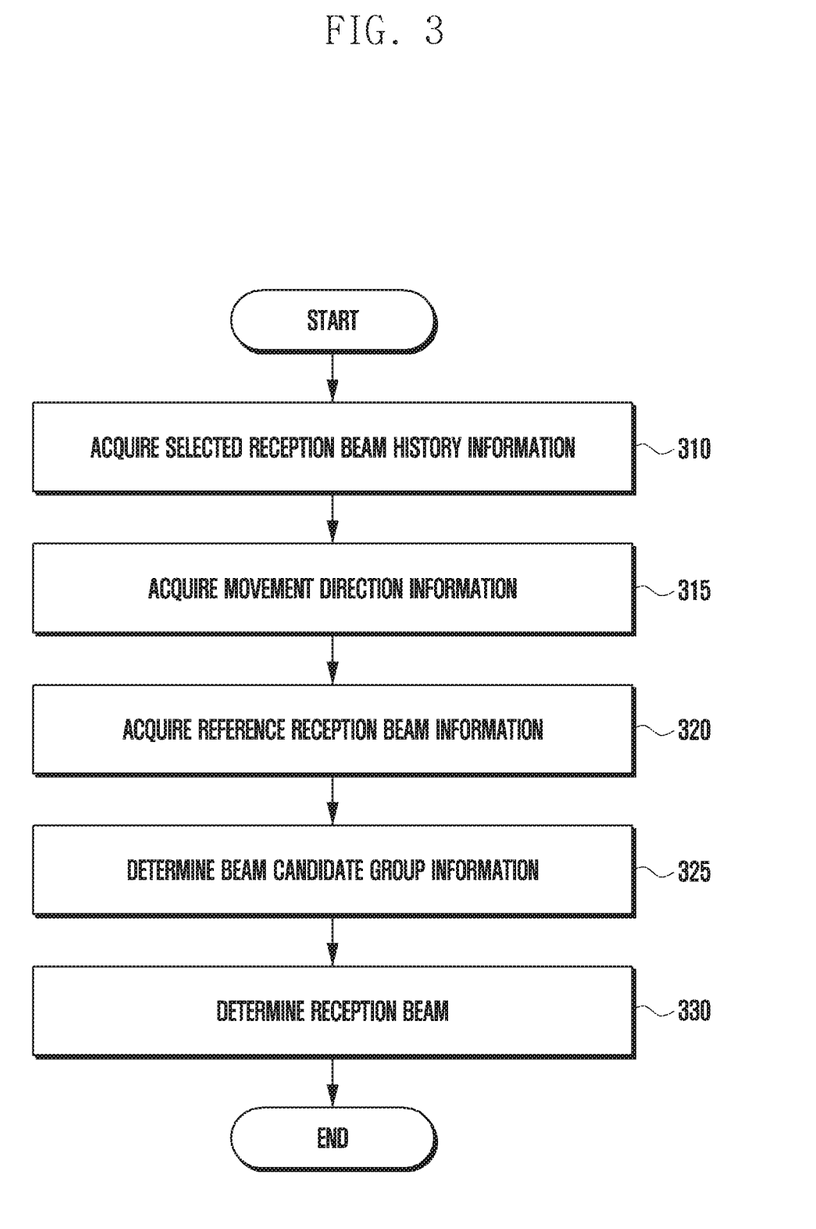
FIG. 3 is a diagram explaining a method for determining a reception beam according to an embodiment of the disclosure.

FIG. 3 is a diagram explaining a method for determining a reception beam according to an embodiment of the disclosure.

With reference to FIG. 3, a terminal may determine the optimum reception beam based on acquired information. More specifically, according to detailed embodiments of the disclosure, a beam candidate group may be determined based on the movement direction and speed information of the terminal.

At operation 310, the terminal may acquire the reception beam information previously selected. More specifically, the terminal may receive a signal by selecting the optimum beam through performing of measurement in a predetermined period or optionally. In this case, a reception beam history selected by the terminal may be acquired. More specifically, reception beam index information selected by the terminal may be acquired, and based on the reception beam index information, at least one piece of information of a location or a direction corresponding to the reception beam may be determined. As described above, acquisition of the reception beam history information may include collection of the selected beam index information and location information of the terminal when determining the selected beam index together.

At operation 315, the terminal may acquire movement direction information of the terminal based on the acquired information. More specifically, the terminal may acquire the movement direction information of the terminal based on the previously selected beam information, and this may be grasped in the form of a trend line having a specific direction. In this case, a change history of a terminal location may be determined based on the previously selected beam information, and in this case, the movement direction information may be determined through a weighted average method to give weight to the location corresponding to the recently selected beam information. In an embodiment, the reception beam history information for determining the movement direction information may be determined based on at least one of the movement direction and the speed of the terminal.

Further, in an embodiment, in case that only the selected reception beam is changed without changing the actual location change of the terminal, the movement direction information of the terminal may be acquired in consideration of such information. More specifically, the movement direction information of the terminal may be determined based on the beam information selected at different locations. In an embodiment, the movement direction of the terminal may include rotation direction information. More specifically, even in case of performing rotation in a state where the location of the terminal is fixed, the movement direction may be changed. Accordingly, in an embodiment, the movement direction may include a meaning of the rotation direction. In this case, the trend of the rotation direction may be determined based on the reception beam history selected by the terminal, and based on this, the terminal may select the beam candidate group.

At operation 320, the terminal may acquire reference reception beam information. In an embodiment, the reference reception beam may be a beam for selecting a beam candidate group based on the movement direction of the terminal and the beam currently selected by the terminal. More specifically, the terminal may determine, as the reference reception beam, a beam index on the trend line that is closest to the location corresponding to the currently selected reception beam based on the trend line determined based on the currently selected reception beam and the movement direction information. Further, if there are plural beam indexes in the same distance, the reference reception beam information may be acquired additionally in consideration of the movement speed.

At operation 325, the terminal may determine the beam candidate group information based on the reference reception beam information and the speed information of the terminal. More specifically, the speed information of the terminal may be determined based on at least one of a Doppler frequency value measured by the terminal and the selected reception beam history. If the speed determined as described above is fast, a larger number of beam candidate groups may be selected, and in case of selecting the same number of beam candidate groups, the beam index deployed on the movement direction based on the reference reception beam may be preferentially included in the beam candidate group. If the number of beam candidate groups is increased in a state where the movement speed is fast, a different value in reception gain between the beam indexes in the candidate group is not great, and thus an elaborate selection is possible, whereas if the number of beam candidate groups is maintained or decreased, it is effective in faster selecting the optimum reception beam in the candidate group. Further, in an embodiment, when determining the beam candidate group information, it is possible to determine the beam candidate group in consideration of at least one of configuration information of the terminal and an application being executed. More specifically, in at least one of a case where the screen of the terminal is set to be rotatable and a case where an application having many rotations, such as a game, is executed, it may be determined that there are many rotations as compared with a typical case, and based on this, the number of beam candidate groups may be determined. In this case, the optimum reception beam may be quickly searched for through reduction of the number of beam candidate groups in accordance with the expected degree of rotations, or more accurate optimum reception beam search may be performed by increasing the number of candidate groups.

At operation 330, the terminal may determine the optimum reception beam in the selected beam candidate group. More specifically, a reception beam coming with the optimum reception gain may be selected based on a signal transmitted from a transmitter including a base station.

By selecting the beam as described above, the reception beam having a higher gain can be determined in accordance with the movement speed of the terminal, and the computing amount of the terminal can be reduced.

Figure 4:
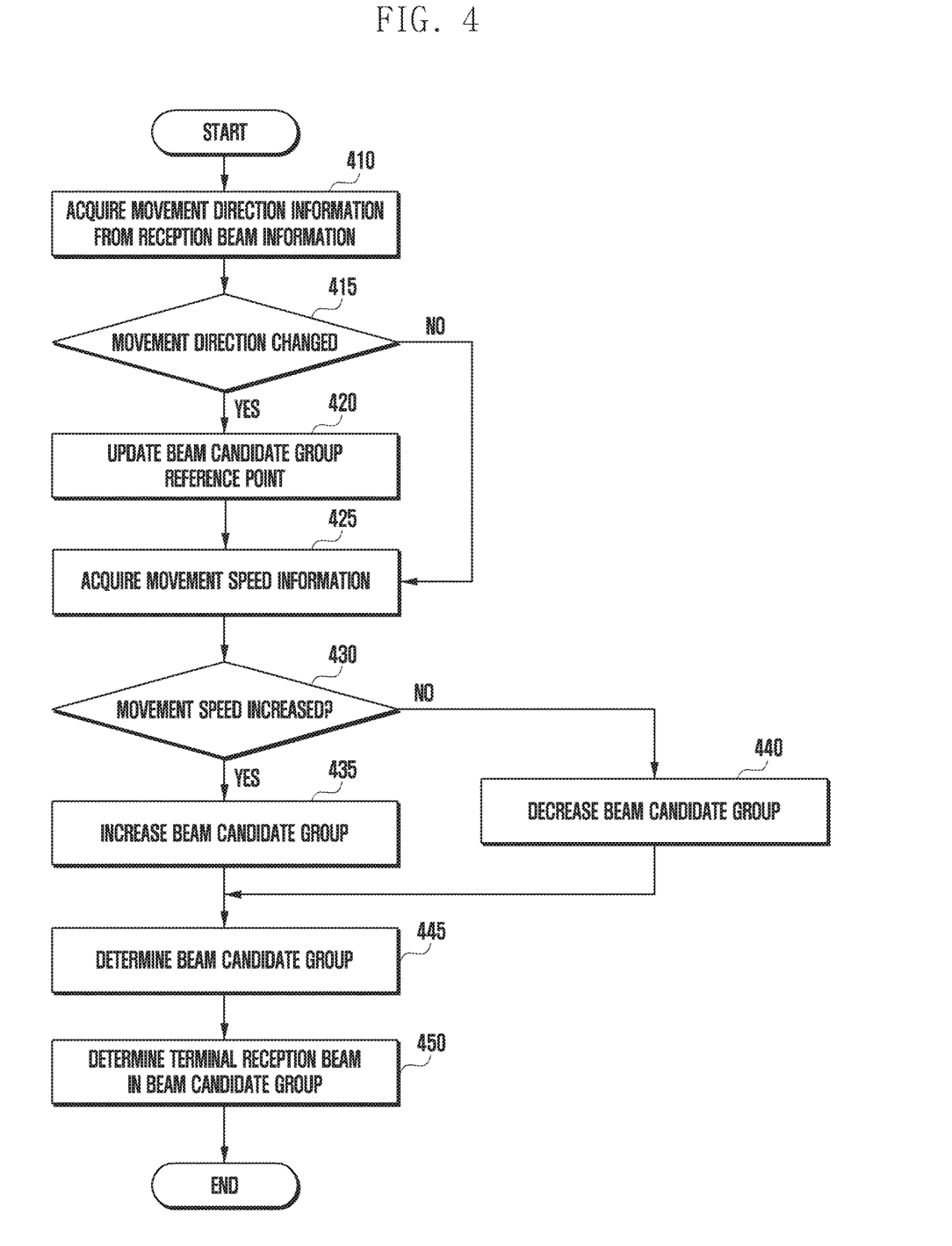
FIG. 4 is a diagram explaining a method for determining a reception beam according to an embodiment of the disclosure.

FIG. 4 is a diagram explaining a method for determining a reception beam according to an embodiment of the disclosure.

With reference to FIG. 4, a terminal may determine the optimum reception beam based on acquired information. More specifically, according to detailed embodiments of the disclosure, a beam candidate group may be determined based on the movement direction and speed information of the terminal.

At operation 410, the terminal may acquire movement direction information based on reception beam information previously selected. More specifically, the terminal may acquire the movement direction information of the terminal based on location information corresponding to the reception beam information previously selected. In an embodiment, the terminal may acquire the location information corresponding to the reception beam previously selected or corresponding beam index information, and may determine a trend line corresponding to a terminal movement direction based on the acquired information.

At operation 415, the terminal may determine whether the movement direction is changed based on the acquired movement direction information. As criteria for determining whether the movement direction is changed, the trend line previously used to select the beam candidate group and the trend line acquired at operation 410 are compared with each other, and if the value of the change is equal to or larger than a predetermined value, it may be determined that the movement direction is changed. In an embodiment, the predetermined value may be differently applied based on at least one of the terminal movement speed and the terminal direction rotation speed.

If the movement direction is changed based on the trend line, or if the movement direction is changed at operation 420, the terminal, at operation 420, may update a reference point location for determining the beam candidate group. More specifically, the reference point may correspond to a specific reception beam index selected based on the location relationship between the trend line and the recently selected reception beam. More specifically, the reception beam corresponding to the index corresponding to the recently selected reception beam and the closest index on the trend line may be selected as a reference reception beam. If the movement direction is not changed, the existing reference reception beam may be used as it is.

At operation 425, the terminal may acquire movement speed information. The movement speed information may be acquired even before the operation 415. The movement speed information may be determined based on a history of a reception beam selected by the terminal, or may be acquired based on a Doppler frequency value measured at the location of the terminal. In an embodiment, the Doppler frequency may differ in accordance with the movement speed of the terminal, and thus the time coherence may differ.

At operation 430, the terminal may determine whether the movement speed is increased. Whether the movement speed is increased may be determined through comparison with the movement speed of the terminal applied when selecting the beam candidate group at the previous operation.

If the movement speed is increased over a predetermined value, the terminal, at operation 435, may increase the number of beam candidate groups, whereas if the movement speed is decreased, the terminal, at operation 440, may decrease the number of beam candidate groups. Further, in an embodiment, if there is no change, the existing number of used beam candidate groups may be maintained.

At operation 445, the terminal may determine the beam candidate group based on the acquired information. More specifically, the beam index adjacent to the location corresponding to the reference reception beam index may be selected as the beam candidate group. In an embodiment, the indexes of the candidate groups selected based on the movement direction and the movement speed may differ from each other. More specifically, the beam index which is located on the movement direction and which is spaced apart from the reference reception beam index may also be included in the candidate group.

At operation 450, the terminal may perform channel measurement based on the beam index of the candidate group, and may select and determine the reception beam having the highest gain as the reception beam of the terminal.

As described above, the number of candidate groups may be adjusted in accordance with the movement speed, and if the movement speed is increased, the time coherence is shortened to cause the size change of the beams in the same time to be increased. In order to cope with the increased beam size change, the number of beam candidate groups should be increased to maintain the performance of the terminal. In contrast, if the movement speed is decreased, the beam size change gets smaller, and thus the performance of the terminal can be maintained even with a small number of beam candidate groups. A beam manager may determine the possibly small number of beam candidate groups within a range where the terminal performance is guaranteed from the relationship between the movement speed and the time coherence.

In an embodiment, the terminal may use the beam candidate group reference point in the existing manner, and may determine the number of beam candidate groups based on the movement speed of the terminal. More specifically, the terminal may select a previously selected or predetermined reference beam, and may determine the reception beam candidate group including the reference beam. Further, according to an embodiment, even if the reference beam is not selected, the beam candidate group may be selected based on the number of beam candidate groups determined based on the movement speed, and the optimum reception beam may be determined from the selected beam candidate group.

According to an embodiment of the disclosure as described above, the terminal beam candidate group can be optimized in accordance with the movement direction and the movement speed in a beamforming system, and through the selection of the beam in the optimized beam candidate group, the terminal can minimize the beam determination time while guaranteeing the optimum reception performance. As described above, by minimizing the beam determination time, the terminal can cope with the fast channel change.

Figure 5:
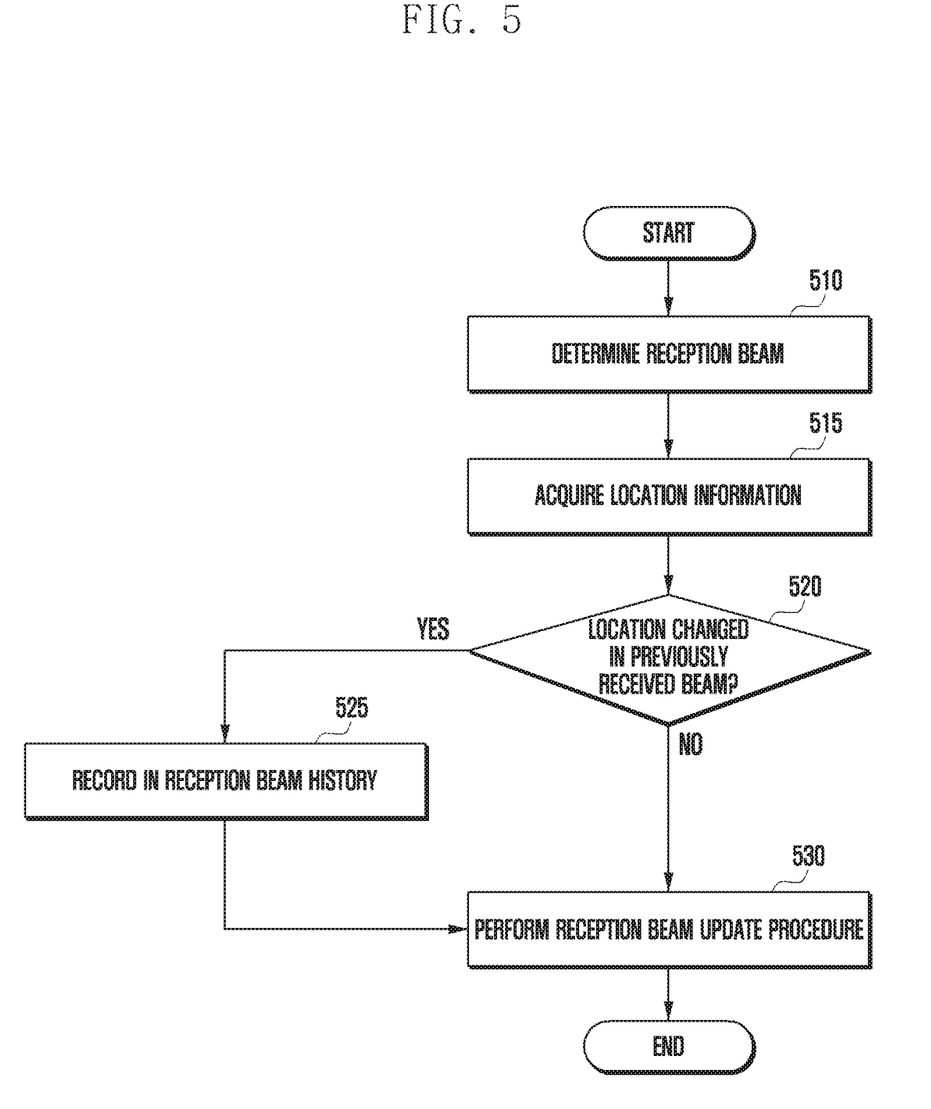
FIG. 5 is a diagram explaining a method for acquiring movement direction information based on location information of a terminal according to an embodiment of the disclosure.

FIG. 5 is a diagram explaining a method for acquiring movement direction information based on location information of a terminal according to an embodiment of the disclosure.

With reference to FIG. 5, at operation 510, the terminal may determine the optimum reception beam from a reception beam candidate group determined based on at least one of the movement direction and movement speed information.

At operation 515, the terminal may acquire the terminal location information, and may map the selected reception beam index onto the acquired terminal location information to be stored.

At operation 520, the terminal may determine whether the location is changed by comparing the location information acquired at operation 515 with the location information of the previously selected reception beam. This is to determine whether the terminal actually moves because the optimum beam may be changed even in case that the terminal is rotated by a user without movement of the terminal.

If the location is changed, at operation 525, the location information can be stored in the selected reception beam history together.

At operation 530, the terminal may perform the reception beam update procedure, and thereafter, may store the location information of the selected reception beam in the same manner as the previous operation.

As described above, in case that the location is actually changed, the location information is recorded in the reception beam history, and thus it is possible to determine the movement trend line of the terminal more similarly to the actual movement trace of the terminal.

Figure 6:
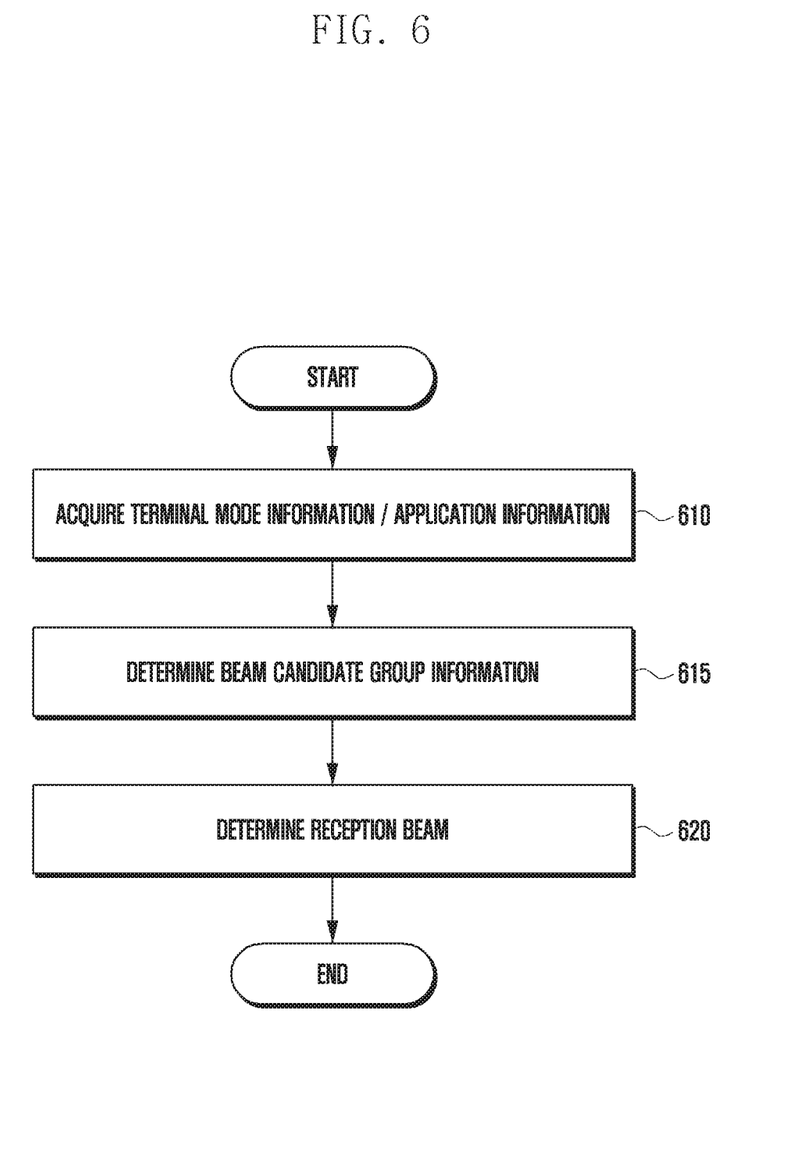
FIG. 6 is a diagram explaining a method for determining a reception beam candidate group based on the state of a terminal according to an embodiment of disclosure.

FIG. 6 is a diagram explaining a method for determining a reception beam candidate group based on the state of a terminal according to an embodiment of disclosure.

With reference to FIG. 6, at operation 610, the terminal may acquire at least one of screen display mode information and executed application information. More specifically, in case of a display mode, it may include mode information in which a screen is rotated in accordance with the rotation of the terminal. In case of configuring the terminal in the screen rotation mode as described above, the rotation may be performed more frequently in comparison with a typical terminal, and thus a beam update should be performed. Further, it is possible to determine whether an application in which the terminal is frequently rotated is executed based on whether a screen rotation is necessary or an operation method among applications being executed. More specifically, in case that a game application is executed, the rotation may be performed more frequently in comparison with the typical terminal.

At operation 615, the terminal may determine beam candidate group information based on at least a part of the information acquired at operation 610. More specifically, if the rotation is performed, it is necessary to determine a more accurate reception beam through extension of the number of reception beam candidate groups. Further, if the rotation occurs frequently, the number of beam candidate groups may be reduced in order to reduce time being consumed to find the optimum beam. In an embodiment, for the rotating terminal in a situation that its movement is not accompanied, the reception beam candidate group information may be determined based on whether the terminal is rotated.

More specifically, if the rotation speed of the terminal is increased, the time coherence is reduced, and in order to select a beam having a higher gain, the number of beam candidate groups may be increased. However, if the necessary data rate of the terminal is equal to or lower than a predetermined value, reduction of a beam determination consumption time may be helpful to improve the performance, and in this case, the number of beam candidate groups may be determined additionally in consideration of the data rate of the terminal.

At operation 620, the terminal may determine the reception beam having the highest gain among the determined reception beam candidate groups. As described above, by determining whether the rotation of the terminal is frequent based on at least one of the terminal mode and the application being executed, it is possible to perform the reception beam selection in consideration of the usage characteristic of the terminal.

Figure 7:
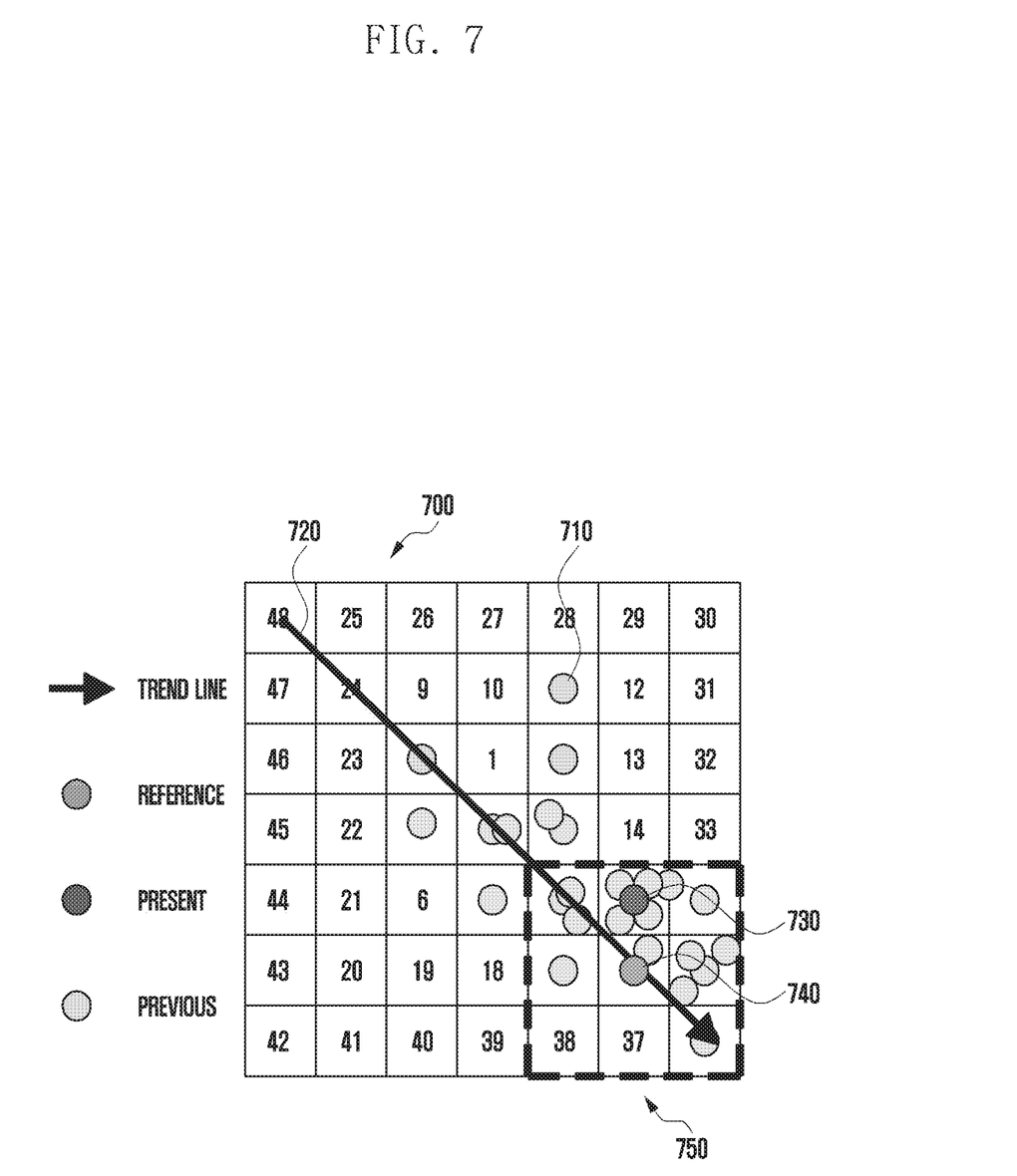
FIG. 7 is a diagram for determining a reference beam and a reception beam candidate group according to an embodiment of the disclosure.

FIG. 7 is a diagram for determining a reference beam and a reception beam candidate group according to an embodiment of the disclosure.

With reference to FIG. 7, as in identification number 700, beam indexes may be deployed. In an embodiment, the deployed beam index may correspond to an actual location or direction of the terminal, and may be related to at least one of a location and a direction corresponding to a beam of an adjacent index. As an example, in case of an adjacent beam on the beam index, it may be actually adjacent to the optimum reception location. As another example, in case of an adjacent beam on the beam index, it may be actually adjacent to the optimum reception direction. As described above, by deploying the corresponding beam index, information related to the trend of the movement direction of the terminal may be acquired based on the history of the selected reception beam index, and information related to the movement speed may also be acquired. In an embodiment, the speed of the terminal may be acquired through measurement of the Doppler frequency or based on the selected reception beam history.

In an embodiment, the previously selected reception beam may be indicated by identification number 710. As described above, a trend line 720 indicating movement direction information of the terminal may be determined based on location information of the previously selected reception beam. Further, the terminal may determine a reference reception beam index 740 based on the locations of the currently used beam index 730 and the trend line 720. More specifically, the reference reception beam index 740 may be determined by projecting the currently used beam index 730 on the trend line 720.

In an embodiment, the reference reception beam index 740 may be selected based on at least one of distances between the currently used beam index 730 and the beam indexes located on the trend line 720 and movement directions thereof. More specifically, the beam index on the trend line closest to the currently used beam index 730 may be determined as the reference reception beam index 740, and if the distances are equal to each other, the beam index located on the movement direction of the trend line may be determined as the reference reception beam index 740.

Further, the terminal may determine at least one candidate group beam index 750 based on the reference reception beam index 740 and the number of candidate groups. In an embodiment, the beam indexes, of which the number of candidate groups is 9 and which includes the reference reception beam index 740 and 8 surrounding beam indexes, may be the candidate group beam indexes 750. In an embodiment, although the beam indexes in the same distance around the reference reception beam index 740 are selected as the candidate group beam indexes 750, the beam indexes located on the trend line based on the movement direction of the trend line 720 may be selected as the candidate group beam indexes, and they may be selected to include the reception beam indexes located farther from the reference reception beam index 740 on the movement direction.

Further, in the overall embodiment, the movement direction of the terminal may consider the rotation direction of the terminal. More specifically, the rotation direction of the terminal may be determined through the trend line information determined based on the previously selected beam history. Further, the terminal may estimate information related to the movement speed of the terminal through the Doppler frequency measurement. As described above, by determining the candidate group based on the rotation direction and the movement speed of the terminal, the beam having a higher gain can be selected.

Figure 8:
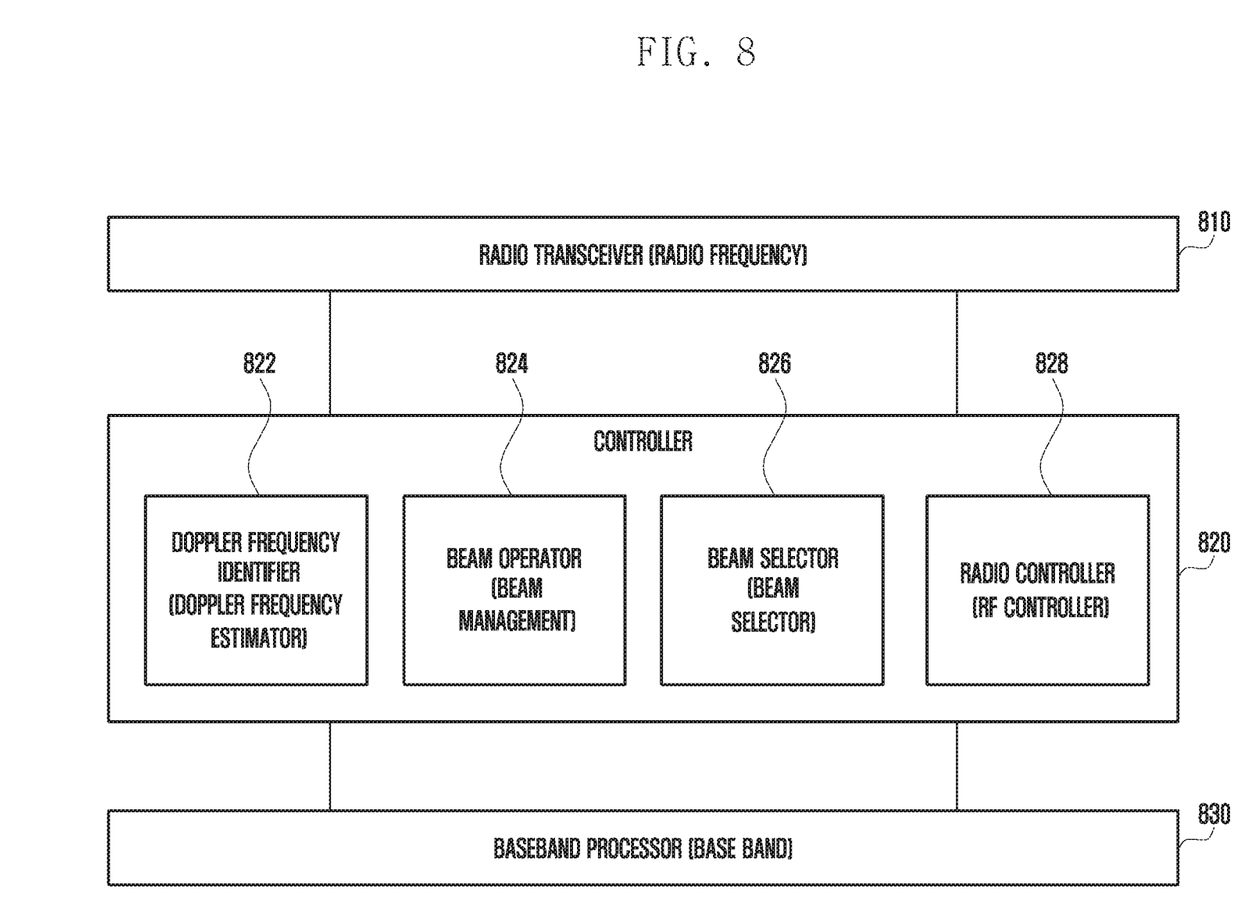
FIG. 8 is a diagram illustrating a terminal according to an embodiment of the disclosure.

FIG. 8 is a diagram illustrating a terminal according to an embodiment of the disclosure.

With reference to FIG. 8, the terminal according to an embodiment may include a radio transceiver 810, a controller 820, and a baseband processor 830.

The radio transceiver 810 may transmit and receive signals. It may include at least one antenna, and may receive the signal based on reception beam information determined by the controller 820.

The baseband processor 830 may perform carrier modulation or the like based on the received signal.

The controller 820 according to an embodiment may control the operation of the terminal, and may include at least one of a Doppler frequency identifier 822, a beam operator 824, and a radio controller 828. In an embodiment, operations of the respective constituent elements of the controller 820 may be performed by the whole controller 820, and may be executed by at least one processor. Further, the respective constituent elements are discriminated from each other for convenience in explanation, and it is apparent that the operations of the respective constituent elements can be performed by the controller 820.

The Doppler frequency identifier 822 may determine the movement speed of the terminal through measurement of the Doppler frequency.

The beam operator 824 may store acquired information, and may perform an operation capable of determining the reception beam candidate group.

The beam selector 826 may perform an operation of selecting the reception beam having the optimum reception gain.

The radio controller 828 may control an operation related to the radio transceiver 810.

As described above, the terminal may perform the operation of the overall embodiment through the operations of the respective constituent elements. On the other hand, although preferred embodiments of the disclosure have been described in the specification and drawings and specific wordings have been used, these are merely used as general meanings to assist those of ordinary skill in the art to gain a comprehensive understanding of the disclosure, and do not limit the scope of the disclosure. It will be apparent to those of ordinary skill in the art to which the disclosure pertains that various modifications are possible on the basis of the technical concept of the disclosure.

The invention claimed is:

1. A communication method of a terminal in a mobile communication system, comprising:
    acquiring movement speed information of the terminal;
    determining a reception beam candidate group based on the movement speed information; and
    determining a reception beam for a signal reception from the reception beam candidate group,
    wherein a number of beam indexes included in the reception beam candidate group is determined based on the movement speed information.

2. The communication method of claim 1, further comprising:
    acquiring movement direction information of the terminal based on reception beam information previously selected by the terminal,
    wherein the reception beam candidate group is determined additionally in consideration of the movement direction information of the terminal.

3. The communication method of claim 2, wherein determining the reception beam candidate group comprises:
    determining a reference reception beam based on the movement direction information and the reception beam information recently selected by the terminal; and
    determining the reception beam candidate group based on the determined reference reception beam.

4. The communication method of claim 3, wherein the reception beam candidate group comprises reception beam indexes adjacent to a beam index corresponding to the reference reception beam.

5. The communication method of claim 3, wherein the reception beam candidate group comprises reception beam indexes located on the movement direction in a beam index corresponding to the reference reception beam.

6. The communication method of claim 2, wherein the movement direction information of the terminal is determined based on a location change corresponding to the reception beam previously selected by the terminal.

7. The communication method of claim 1, wherein the number of beam indexes included in the reception beam candidate group is determined based on the movement speed information and screen display mode information of the terminal.

8. The communication method of claim 1, wherein the number of beam indexes included in the reception beam candidate group is determined based on the movement speed information and application information being executed by the terminal.

9. The communication method of claim 1, wherein the determined reception beam is a reception beam having a highest reception gain in the reception beam candidate group.

10. A terminal in a mobile communication system, comprising:
    a transceiver; and
    a controller connected to the transceiver and configured to:
        acquire movement speed information of the terminal,
        determine a reception beam candidate group based on the movement speed information, and
        determine a reception beam for a signal reception from the reception beam candidate group,
    wherein a number of beam indexes included in the reception beam candidate group is determined based on the movement speed information.

11. The terminal of claim 10,
    wherein the controller is configured to:
        acquire movement direction information of the terminal based on reception beam information previously selected by the terminal,
        determine a reference reception beam based on the movement direction information and the reception beam information recently selected by the terminal, and
        determine the reception beam candidate group based on the determined reference reception beam, and
    wherein the reception beam candidate group is determined additionally in consideration of the movement direction information of the terminal.

12. The terminal of claim 11, wherein the reception beam candidate group comprises reception beam indexes adjacent to a beam index corresponding to the reference reception beam or reception beam indexes located on the movement direction in a beam index corresponding to the reference reception beam.

13. The terminal of claim 10, wherein the number of beam indexes included in the reception beam candidate group is determined based on the movement speed information, and screen display mode information of the terminal, or application information being executed by the terminal.

14. The terminal of claim 11, wherein the movement direction information of the terminal is determined based on a location change corresponding to the reception beam previously selected by the terminal.

* * * * *